US005787030A

United States Patent [19]
Prabhu et al.

[11] Patent Number: 5,787,030
[45] Date of Patent: Jul. 28, 1998

[54] CORRECT AND EFFICIENT STICKY BIT CALCULATION FOR EXACT FLOATING POINT DIVIDE/SQUARE ROOT RESULTS

[75] Inventors: J. Arjun Prabhu, Palo Alto; Grzegorz B. Zyner, San Jose, both of Calif.

[73] Assignee: Sun Microsystems, Inc., Mountain View, Calif.

[21] Appl. No.: 498,397

[22] Filed: Jul. 5, 1995

[51] Int. Cl.$^6$ .................................. G06F 7/52; G06F 7/38
[52] U.S. Cl. ................ 364/761; 364/748.05; 364/748.1; 364/752; 364/764
[58] Field of Search ................... 364/745, 748, 364/761–767, 756, 744, 746.2, 787, 748.05, 748.1, 752

[56] References Cited

U.S. PATENT DOCUMENTS

| | | | |
|---|---|---|---|
| 5,023,827 | 6/1991 | Kehl et al. | 364/744 |
| 5,258,944 | 11/1993 | Smith | 364/748 |
| 5,272,660 | 12/1993 | Rossbach | 364/748 |
| 5,357,455 | 10/1994 | Sharangpani et al. | 364/767 |
| 5,386,376 | 1/1995 | Girard et al. | 364/767 |

OTHER PUBLICATIONS

G.S. Taylor, "Radix 16 SRT dividers with overlapped quotient selection stages", Proc. Seventh IEEE Symp. Compt. Arithmetic, pp. 64–71, 1987.

M.D. Ercegovac and T. Lang, "Division and Square Root: Digital-recurrence Algorithms and Implementations", Kluwer Academic Publishers, 1994, Ch. 3.

M.D. Ercegovac, T. Lang, J.G. Nash, L.P. Chow, "An Area-Time Efficient Binary Divider", Proc. IEEE International Conference on Computer Design, pp. 645–648, 1987.

*Primary Examiner*—Paul P. Gordon
*Assistant Examiner*—Emmanuel L. Moise
*Attorney, Agent, or Firm*—Limbach & Limbach L.L.P.

[57] ABSTRACT

Quotient digit selection logic is modified so as to prevent a partial remainder equal to the negative divisor from occurring. An enhanced quotient digit selection function prevents the working partial remainder from becoming negative if the result is exact. The enhanced quotient digit selection logic chooses a quotient digit of zero instead of a quotient digit of one when the actual partial remainder is zero. Using a five bit estimated partial remainder where the upper four bits are zero, a possible carry propagation into fourth most significant bit is detected. This can be accomplished by looking at the fifth most significant sum and carry bits of the redundant partial remainder. If they are both zero, then a carry propagation out of that bit position into the least significant position of the estimated partial remainder is not possible, and a quotient digit of zero is chosen. In the alternative case in which one or both of the fifth most significant carry or sum bits of the redundant partial remainder are ones, a quotient digit of one is chosen. This provides a one cycle savings since negative partial remainders no longer need to be restored before calculating the sticky bit. Extra hardware is eliminated because it is no longer necessary to provide any extra mechanism for restoring the preliminary final partial remainder. Latency is improved because no additional cycle time is required to restore negative preliminary partial remainders. An optimized five-level circuit is shown which implements the enhanced quotient selection function.

13 Claims, 6 Drawing Sheets

CORRECT AND EFFICIENT STICKY BIT CALCULATION FOR EXACT FLOATING POINT DIVIDE/SQUARE ROOT RESULTS

BACKGROUND OF THE INVENTION

1. Field of the Invention

The present invention relates to the field of floating point dividers in microprocessors. Specifically, the present invention relates to quotient digit selection rules in SRT division/square root implementations which prevent negative final partial remainders from occurring when results are exact.

2. Discussion of the Related Art

The Sweeney, Robertson, Tocher ("SRT") algorithm provides one way of performing non-restoring division. See, J. E. Robertson, "A new class of digital division methods," *IEEE Trans. Comput.*, vol. C-7, pp. 218–222, September 1958, and K. D. Tocher, "Techniques of multiplication and division for automatic binary computers," *Quart. J. Mech. Appl. Math.*, vol. 11, pt. 3, pp. 364–384, 1958. Digital division takes a divisor and a dividend as operands and generates a quotient as output. The quotient digits are calculated iteratively, producing the most significant quotient digits first. In SRT division, unlike other division algorithms, each successive quotient digit is formulated based only on a few of the most significant partial remainder digits, rather than by looking at the entire partial remainder, which may have a very large number of digits. Since it is not possible to insure correct quotient digit selection without considering the entire partial remainder in any given iteration, the SRT algorithm occasionally produces incorrect quotient digit results. However, the SRT algorithm provides positive, zero, and negative quotient digit possibilities. If the quotient digit in one iteration is overestimated, then that error is corrected the next iteration by selecting a negative quotient digit. In SRT division, quotient digits must never be underestimated; quotient digits must always be overestimated or correctly estimated. By never underestimating any quotient digits, the partial remainder is kept within prescribed bounds so as to allow the correct final quotient to be computed. Because the SRT algorithm allows negative quotient digits, the computation of the final quotient output usually involves weighted adding and subtracting of the quotient digits, rather than merely concatenating all the quotient digits as in normal division.

The higher the radix the more digits of quotient developed per iteration but at a cost of greater complexity. A radix-2 implementation produces one digit per iteration; whereas a radix-4 implementation produces two digits per iteration. FIG. 1 illustrates a simple SRT radix-2 floating point implementation. The simple SRT radix-2 floating point implementation shown in FIG. 1 requires that the divisor and dividend both be positive and normalized; therefore, $\frac{1}{2} \leq D$, Dividend<1. The initial shifted partial remainder, 2PR[0], is the dividend. Before beginning the first quotient digit calculation iteration, the dividend is loaded into the partial remainder register 100; thus, the initial partial remainder is the dividend. Subsequently, the partial remainders produced by iteration are developed according to the following equation.

$$PR_{i+1} = 2PR_i - q_{i+1}D \qquad (1)$$

In Equation 1, $q_{i+1}$ is the quotient digit, and has possible values of $-1$, $0$, or $+1$. This quotient digit $q_{i+1}$ is solely determined by the value of the previous partial remainder and is independent of the divisor. The quotient selection logic 102 takes only the most significant four bits of the partial remainder as input, and produces the quotient digit.

In division calculations, the divisor remains constant throughout all iterations. However, square root calculations typically involve adjustments to the divisor stored in the divisor register 101 after each iteration. Therefore, the independence of the quotient digit selection on the divisor is an attractive feature for square root calculations.

The partial remainder is typically kept in redundant carry save form so that calculations of the next partial remainder can be performed by a carry-save adder instead of slower and larger carry-propagate adders. The partial remainder is converted into non-redundant form after all iterations have been performed and the desired precision has been reached. Because the SRT algorithm allows overestimation of quotient digits resulting in a negative subsequent partial remainder, it is possible that the last quotient digit is overestimated, so that the final partial remainder is negative. In that case, since it is impossible to correct for the overestimation, it is necessary to maintain Q and Q-1, so that if the final partial remainder is negative, Q-1 is selected instead of Q. The quotient digits are normally also kept in redundant form and converted to non-redundant form at the end of all iterations. Alternatively, the quotient and quotient minus one (Q and Q-1) can be generated on the fly according to rules developed in M. D. Ercegovac and T. Lang, "On-the-fly rounding," *IEEE Trans. Comput.*, vol. 41, no. 12, pp. 1497–1503, December 1992.

The SRT algorithm has been extended to square root calculations allowing the utilization of existing division hardware. The simplified square root equation looks surprisingly similar to that of division. See, M. D. Ercegovac and T. Lang, "Radix-4 square root without initial PLA," *IEEE Trans. Comput.*, vol. 39, no. 8, pp. 1016–1024, August 1990. The iteration equation for square root calculations is as follows.

$$PR_{i+1} = 2PR_i - q_{i+1}(2Q_i + q_{i+1}2^{-(i+1)}) \qquad (2)$$

In Equation 2, the terms in parentheses are the effective divisor. For square root calculations, the so-called divisor is a function of $Q_i$, which is a function of all the previous root digits $q_1$ through $q_i$. The root digits will be referred to as "quotient digits" to maintain consistency in terminology. Therefore, in order to support square root calculation using the same hardware as used for division, on-the-fly quotient generation is required in order to update the divisor after each iteration.

Binary division algorithms are analogous to standard base 10 long division which is taught in grammar school. In R/D=Q, each quotient digit for Q is guessed. In order to determine the first quotient digit, a guess for the proper quotient digit is multiplied by the divisor, and that product is subtracted from the dividend to produce a remainder. If the remainder is greater than the divisor, the guess for the quotient digit was too small; if the remainder is negative, the guess for the quotient digit was too large. In either case, when the guess for the quotient digit is incorrect, the guess must be changed so that the correct quotient digit is derived before proceeding to the next digit. The quotient digit is correct when the following relation is true: $0 \leq PR < D$, in which PR stands for the partial remainder after subtraction of the quotient digit multiplied by the divisor.

The key to the SRT division algorithm is that negative quotient digits are permitted. For example, in base 10, in addition to the standard digits 0 through 9, quotient digits may take on values of $-1$ through $-9$. Consider the division operation 600÷40. If the correct quotient digits are selected for each iteration, the correct result is 15. However, assume for the moment that during the first iteration, a quotient digit of 2 was incorrectly guessed instead of the correct digit of 1. The partial remainder after 2 has been selected as the first quotient digit is 600−(2 * 40 * 10¹)=−200. According to SRT division, this error can be corrected in subsequent iterations, rather than having to back up and perform the first iteration again. According to SRT division, assume that the second quotient digit is correctly guessed to be −5. The partial remainder after that iteration will be −200−(−5 * 40 * 10⁰)=0. When the partial remainder after an iteration is zero, the correct values for all the remaining digits are zeros. Thus, the computed result is 2*10¹+−5*10⁰=15, which is the correct result. The SRT algorithm thus allows an overestimation of any given quotient digit to be corrected by the subsequent selection of one or more negative quotient digits. It is worth noting that the estimated quotient digit must not be more than one greater than the correct quotient digit in order to subsequently reduce the partial remainder to zero, thus computing the correct result. If errors greater than positive one were allowed in estimating quotient digits, then quotient digits less than −9 (for example −10, −11, etc.) would be required in base 10. Similarly, since the range of quotient digits is not expanded in the positive direction at all according to the SRT algorithm, underestimation of the correct quotient digit is fatal, because the resulting partial remainder will be greater than the divisor multiplied by the base, and a subsequent quotient digit higher than 9 (for example 10, 11, etc.) in base 10 would be required. Therefore, in order to keep the partial remainder within prescribed bounds, the quotient digit selection must never underestimate the correct quotient digit, and if it overestimates the quotient digit, it must do so by no more than one.

It is possible to guarantee that the above criteria for keeping the partial remainder within prescribed bounds will be satisfied without considering all the partial remainder digits. Only a few of the most significant digits of the partial remainder must be considered in order to choose a quotient digit which will allow the correct result to be computed.

SRT division requires a final addition after all quotient digits have been selected to reduce the redundant quotient representation into standard non-redundant form having only non-negative digits.

In binary (base 2) which is utilized in modern electrical computation circuits, SRT division provides quotient digits of +1, 0, or −1. The logic 102 which generates quotient selection digits is the central element of an SRT division implementation. Early research indicated that only the most significant three bits of redundant partial remainder are necessary inputs for a radix-2 quotient digit selection function. (See, S. Majerski, "Square root algorithms for high-speed digital circuits," *Proc. Sixth IEEE Symp. Comput. Arithmetic.*, pp. 99–102, 1983; and D. Zuras and W. McAllister, "Balanced delay trees and combinatorial division in VLSI," *IEEE J. Solid-State Circuits.*, vol. SC-21, no. 5, pp. 814–819, October 1986.) However more recent studies have shown that four bits are required to correctly generate quotient digit selection digits and keep the partial remainder within prescribed bounds. (See M. D. Ercegovac and T. Lang, *Division and Square Root: Digit-recurrence Algorithms and Implementations*, Kluwer Academic Publishers, 1994, ch. 3; S. Majerski, "Square-rooting algorithms for high-speed digital circuits," *IEEE Trans. Comput.*, vol. C-34, no. 8, pp. 724–733, August 1985; P. Montuschi and L. Ciminiera, "Simple radix 2 division and square root with skipping of some addition Steps," *Proc. Tenth IEEE Symp Comput. Arithmetic.* pp. 202–209, 1991; and V. Peng, S. Samudrala, and M. Gavrielov, "On the implementation of shifters, multipliers, and dividers in floating point units," *Proc. Eighth IEEE Symp. Comput. Arithmetic*, pp. 95–101, 1987. The selection rules according to the prior art can be expressed as in the following equations in which PR represents the most significant four bits of the actual partial remainder, and in which the decimal point appears between the third and fourth most significant digits.

The partial remainder is in two's complement form, so that the first bit is the sign bit.

$q_{i+1}=1$, if $0 \leq 2PR[i] \leq 3/2$, $q_{i+1}=0$, if $2PR[i]=-1/2$, $q_{i+1}=-1$, if $-1/2 \leq 2PR[i] \leq -1$.

Because the partial remainder is stored in register 100 in carry-save form, the actual most significant four bits are not available without performing a full carry propagate addition of the carry and sum portions of the partial remainder. Because it is desirable to avoid having to perform a full carry propagate addition during each iteration in order to compute the most significant four bits of the partial remainder, quotient digit selection rules can be developed using an estimated partial remainder.

The estimated partial remainder ($PR_{est}$) is computed using only a four-bit carry propagate adder that adds the most significant four bits of the carry and sum portions of the actual partial remainder. This simplification represents a significant savings of latency because the equivalent of a full 59 bit carry propagate addition would otherwise be required to compute the actual most significant four bits of the partial remainder. The estimated partial remainder $PR_{est}$ does not reflect the possibility that a carry might propagate into the bit position corresponding to the least significant bit position of the estimated partial remainder if a full 59-bit carry propagate addition had been performed. The truth table below describes the quotient selection rules according to the prior art where the most significant four bits of the estimated partial remainder are used to select the correct quotient digit. Thus, the truth table below takes into consideration the fact that the most significant four bits of the true partial remainder may differ from the most significant four bits of the estimated partial remainder.

TABLE I

Truth Table for Prior Art Radix-2 Quotient Selection

| 2PR[i]$_{estimated}$ | quotient digit | Comments |
| --- | --- | --- |
| 100.0 | don't care | 2PR never < −5/2 |
| 100.1 | don't care | 2PR never < −5/2 |
| 101.0 | −1* | 2PR never < −5/2, but 2PR could be 101.1 when 2PR$_{act}$ is 101.0 |
| 101.1 | −1 | |
| 110.0 | −1 | |
| 110.1 | −1 | |
| 111.0 | −1 | 2PR could = 111.1 |
| 111.1 | 0 | 2PR could = 000.0 |
| 000.0 | +1 | |
| 000.1 | +1 | |
| 001.0 | +1 | |
| 001.1 | +1 | |
| 010.0 | don't care | 2PR never > 3/2 |
| 010.1 | don't care | 2PR never > 3/2 |
| 011.0 | don't care | 2PR never > 3/2 |
| 011.1 | don't care | 2PR never > 3/2 |

In the above truth table, the four bits representing 2PR$_{est}$ are a non-redundant representation of the most significant four carry and sum bits of the partial remainder. The fourth bit is the fraction part, so that the resolution of the most significant four bits of the partial remainder is ½.

The quotient selection logic is designed to guess correctly or overestimate the true quotient result, e.g. predicting 1 instead of 0, or 0 instead of −1. The SRT algorithm corrects itself later if the wrong quotient digit has been chosen.

The prior art truth table for SRT radix-2 quotient selection logic has several don't care inputs because the partial remainder is constrained to $-\frac{5}{2} \leq 2PR[i] \leq \frac{5}{2}$. The estimated partial remainder is always less than or equal to the true most significant bits of the partial remainder because the less significant bits are ignored. Therefore, there is a single case (marked with an asterisk in the above table) where the estimated partial remainder appears to be out of bounds. By construction, the real partial remainder is within the negative bound because the SRT algorithm as implemented will never produce an out of bounds partial remainder, so −1 is the appropriate quotient digit to select. There are two other cases (those corresponding to the entries for 111.0 and 111.1 in Table I) in which the quotient digit selected based on the estimated partial remainder differs from what would be chosen based on the real partial remainder. However, in both of these instances of "incorrect" quotient digit selection, the quotient digit is not underestimated and the partial remainder is kept within prescribed bounds, so that the final result will still be generated correctly.

The following table II illustrates the quotient selection logic described in Table I in a simplified form. In the table below, an "x" represents a "don't care" logic variable. Obviously, the third case, in which 1xx.x produces a −1 quotient digit does not apply when the estimated partial remainder is 111.1, such that the second entry applies, and the correct quotient digit is 0.

TABLE II

Simplified Prior Art QSLC Truth Table

| $2PR[i]_{estimated}$ | quotient digit$_{i+1}$ |
|---|---|
| 0xx.x | +1 |
| 111.1 | 0 |
| 1xx.x | −1 |

Floating point operations generate a sticky bit along with the result in order to indicate whether the result is inexact or exact. When the result is inexact, the sticky bit is asserted; conversely, when the result is exact, the sticky bit is deasserted. Essentially, the sticky bit indicates whether or not any of the bits of less significance are non-zero. The sticky bit is also used with the guard and round bits for rounding according to IEEE Standard 754. See, "IEEE standard for binary floating-point arithmetic," ANSI/IEEE Standard 754-1985, New York, The Institute of Electrical and Electronic Engineers, Inc., 1985.

For divide and square root operations, the sticky bit is determined by checking if the final partial remainder is non-zero. The final partial remainder is defined as the partial remainder after the desired number of quotients bits have been calculated. Since the partial remainder is in redundant form, a carry-propagate addition is performed prior to zero-detection. A circuit for computing the sticky bit is shown in FIG. 2. In FIG. 2, the carry 201 and sum 202 portions of the final partial remainder are added together by the carry propagate adder 200. The most significant bit output by the adder 200 is the sign bit 203 of the final partial remainder. As illustrated in FIG. 1, the division hardware accumulates the quotient Q and the quotient minus one Q-1. When the final partial remainder is negative, Q-1 is the proper quotient; when the final partial remainder is zero or positive, Q is the correct quotient. Thus, the sign bit 203 is used to select the correct quotient. Referring again to FIG. 2, the zero detector 204 determines if all bits of the non-redundant final partial remainder 205 are zeros and outputs a the sticky bit 206. The zero detector 204 is logically equivalent to a large 59-input OR gate.

At first glance, the above solution seems perfectly reasonable for all final partial remainder possibilities, positive or negative. However, in the rare case in which the result is exact, the final partial remainder will be equal to the negative divisor. For example, consider a number divided by itself, as illustrated in the table below, in which PR[i] represents the partial remainder after the ith quotient digit has been selected.

TABLE III

| Division iterations for a number divided by itself | | | |
|---|---|---|---|
| PR[0] = Init dividend/2 = D/2 | q[1] = +1 Q = 1 | Q − 1 = 0 | |
| PR[1] = 2(D/2) − ( 1)D = 0 | q[2] = +1 Q = 11 | Q − 1 = 10 | |
| PR[2] = 2(0) − ( 1)D = −D | q[3] = −1 Q = 101 | Q − 1 = 100 | |
| PR[3] = 2(−D) − (−1)D = −D | q[4] = −1 Q = 1001 | Q − 1 = 1000 | |
| PR[n] = 2(−D) − (−1)D = −D | q[5] = −1 Q = 100...001 | Q − 1 = 100...000 | |

Since the dividend is always positive and normalized, the quotient digit from the first iteration is one. This is a consequence of the fact that a positive normalized number has a sign bit of zero and a most significant digit of one. When a positive normalized number is divided by two, presumably by right shifting by one bit position, the most significant bit necessarily becomes a zero. (If a negative number is divided by two, the most significant bit is one, because the most significant bits are sign extended so as to match the sign bit giving the correct two's complement representation.) When the most significant bit is a zero, Table II above dictates that a quotient digit of one should be selected.

For the second iteration shown in Table III, the partial remainder PR[1] is zero which causes the second quotient digit to be one. For all subsequent iterations, the partial remainder will equal the negative divisor and quotient digits of minus one will be selected. After the last iteration, performing a sign detect on the final partial remainder PR[n] determines that the final partial remainder is negative and indicates that Q-1 should be chosen. This is in fact the correct result. However, this same final partial remainder is non-zero which erroneously suggests an inexact result and erroneously suggests that the sticky bit should be asserted.

This problem extends to any division operation for which the result should be exact. Fundamentally, the problem is a consequence of the fact that the quotient selection logic is defined to guess positive for a zero partial remainder and correct for it later, as illustrated by Table II. The prior art dividers require one processor cycle for restoration of negative final partial remainders prior to sticky bit calculation. There is a desire for correct sticky bit calculation in the art. It would be advantageous to develop a divider which did not restore negative final partial remainders but could still guarantee correct computation of the sticky bit.

SUMMARY OF THE INVENTION

The present invention provides the ability to correctly and efficiently compute the sticky bit during floating point division and square root computations when the final partial remainder is negative. The present invention further provides an optimized quotient selection circuit implementing quotient selection rules according to the present invention with minimized latency and size.

The present invention provides an enhanced quotient digit selection function which prevents the working partial remainder from becoming negative if the result is exact. This creates a one cycle savings since negative partial remainders no longer need to be restored before calculating the sticky bit.

According to the present invention, the quotient digit selection logic is modified so as to prevent a partial remainder equal to the negative divisor from occurring. To correctly and efficiently compute the sticky bit for exact division results, enhancing the quotient digit selection function so as to prevent the formation of a negative partial remainder equal to the negative divisor is an ideal solution because it saves hardware and improves latency. Extra hardware is eliminated because it is no longer necessary to provide any extra mechanism for restoring the preliminary final partial remainder. Latency is improved because additional cycle time is not required to restore negative preliminary partial remainders.

According to the present invention, the quotient digit selection logic is altered so as to choose a quotient digit of zero instead of a quotient digit of one when the actual partial remainder is zero. Using a five bit estimated partial remainder where the upper four bits are zero, a possible carry propagation into fourth most significant bit is detected. This can be accomplished by looking at the fifth most significant sum and carry bits of the redundant partial remainder. If they are both zero, then a carry propagation out of that bit position into the least significant position of the estimated partial remainder is not possible, and a quotient digit of zero is chosen. In the alternative case in which one or both of the fifth most significant carry or sum bits of the redundant partial remainder are ones, a quotient digit of one is chosen.

These and other features and advantages of the present invention will be apparent from the Figures as explained in the detailed description of the invention.

The detailed description of the invention explains the Figures in greater detail.

DETAILED DESCRIPTION OF THE INVENTION

Several options must be considered in order to correctly compute the sticky bit in the case of negative final partial remainders in floating point division operations. The simplest solution is to restore negative final partial remainders by adding the divisor before performing zero-detection. Given the area expense of an additional carry-propagate adder, the solution should try to take advantage of existing hardware. Two ways to achieve this are shown in FIGS. 3 and 4.

Figure 1:
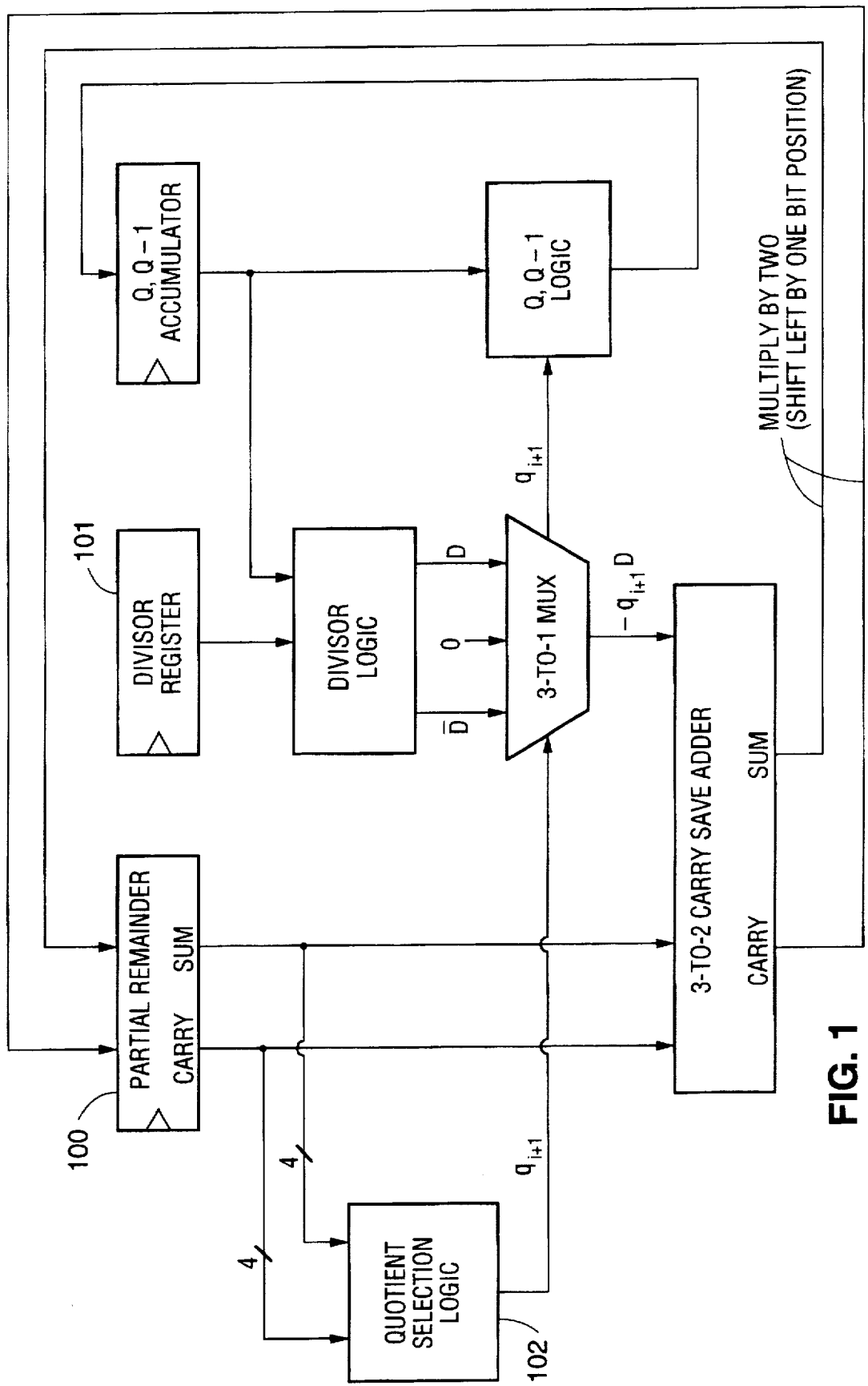
FIG. 1 is a simplified logical illustration of a conventional hardware division module implementing the iterative SRT division algorithm.
Figure 3:
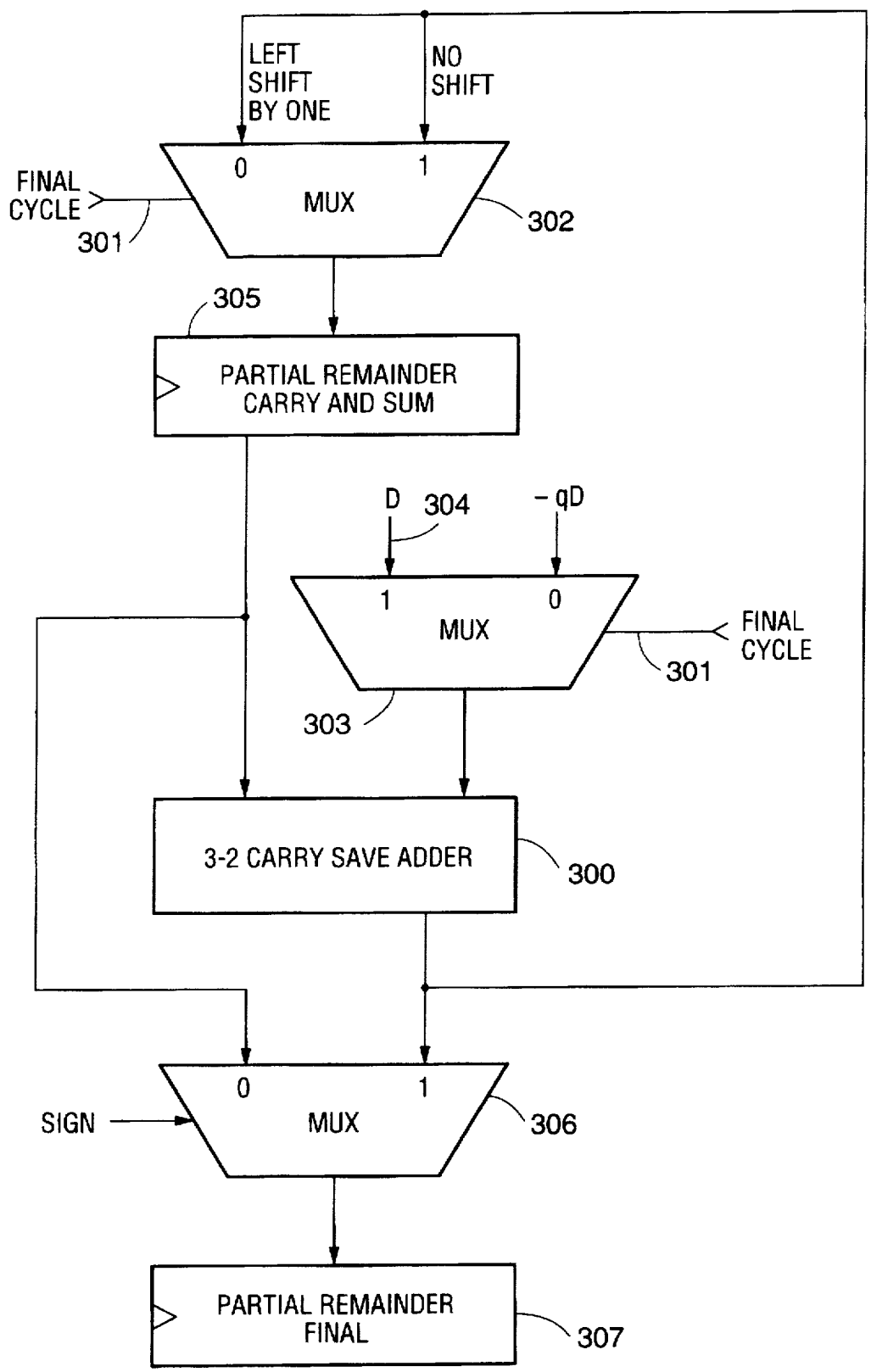
FIG. 3 is a simplified logical illustration of one hardware division module which implements the iterative SRT division algorithm or alternatively restores negative final partial remainders.

The solution in FIG. 3 takes advantage of the carry save adder 300 that already exists to implement the basic iterative step. During normal operation, the final cycle signal 301 is low so that multiplexors 302 and 303 are configured so as to implement the standard iterative step described in conjunction with FIG. 1. However, during the final cycle, the final cycle signal 301 is high, and the multiplexor 303 directs the divisor D 304 to the adder 300 to be added to the partial remainder carry and sum portions stored in register 305. If the sign of the preliminary partial remainder was negative, multiplexor 306 outputs the result from adder 300 to the final partial remainder flip-flop 307.

Figure 2:
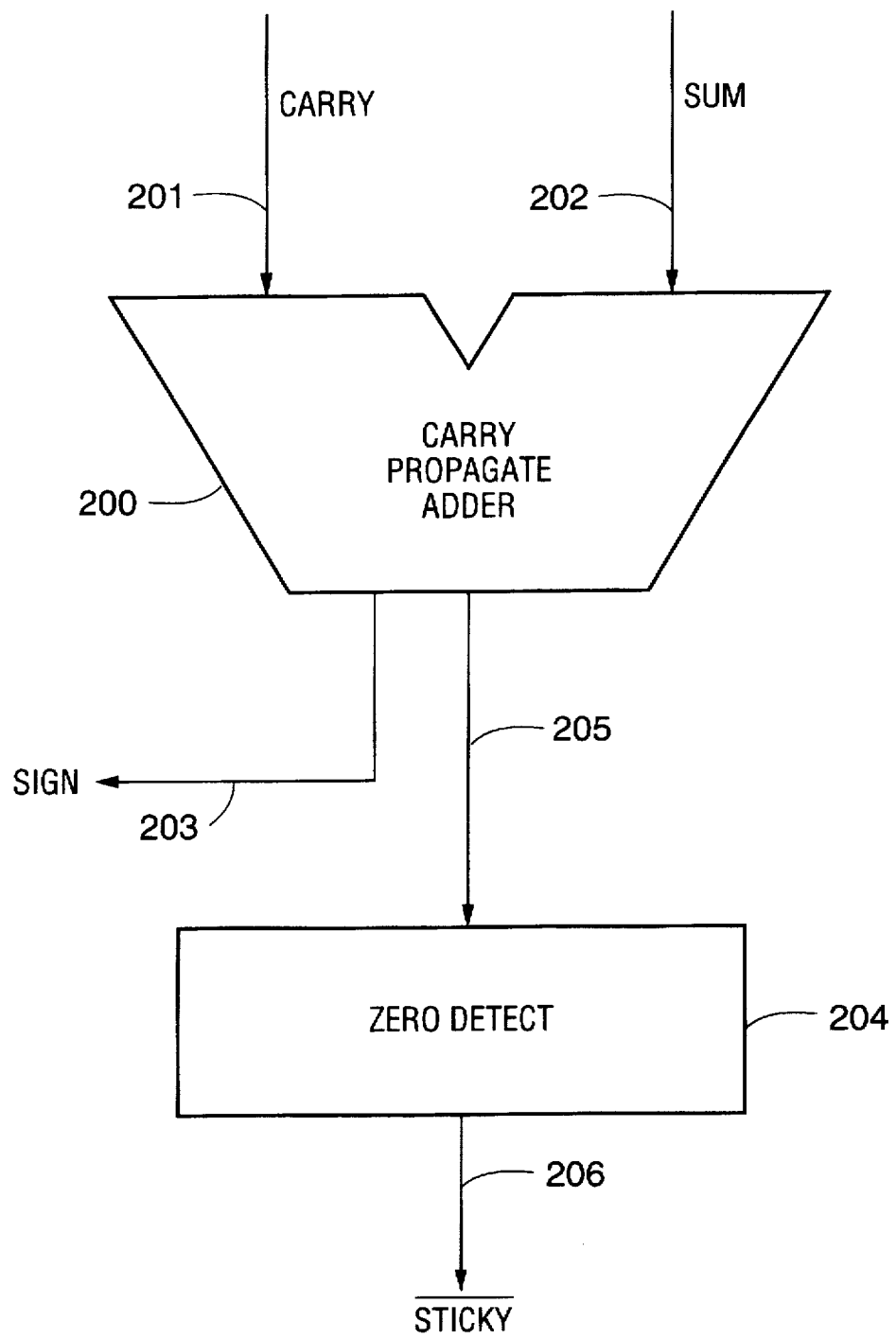
FIG. 2 is a simplified logic diagram of a conventional sticky bit computation circuit.
Figure 4:
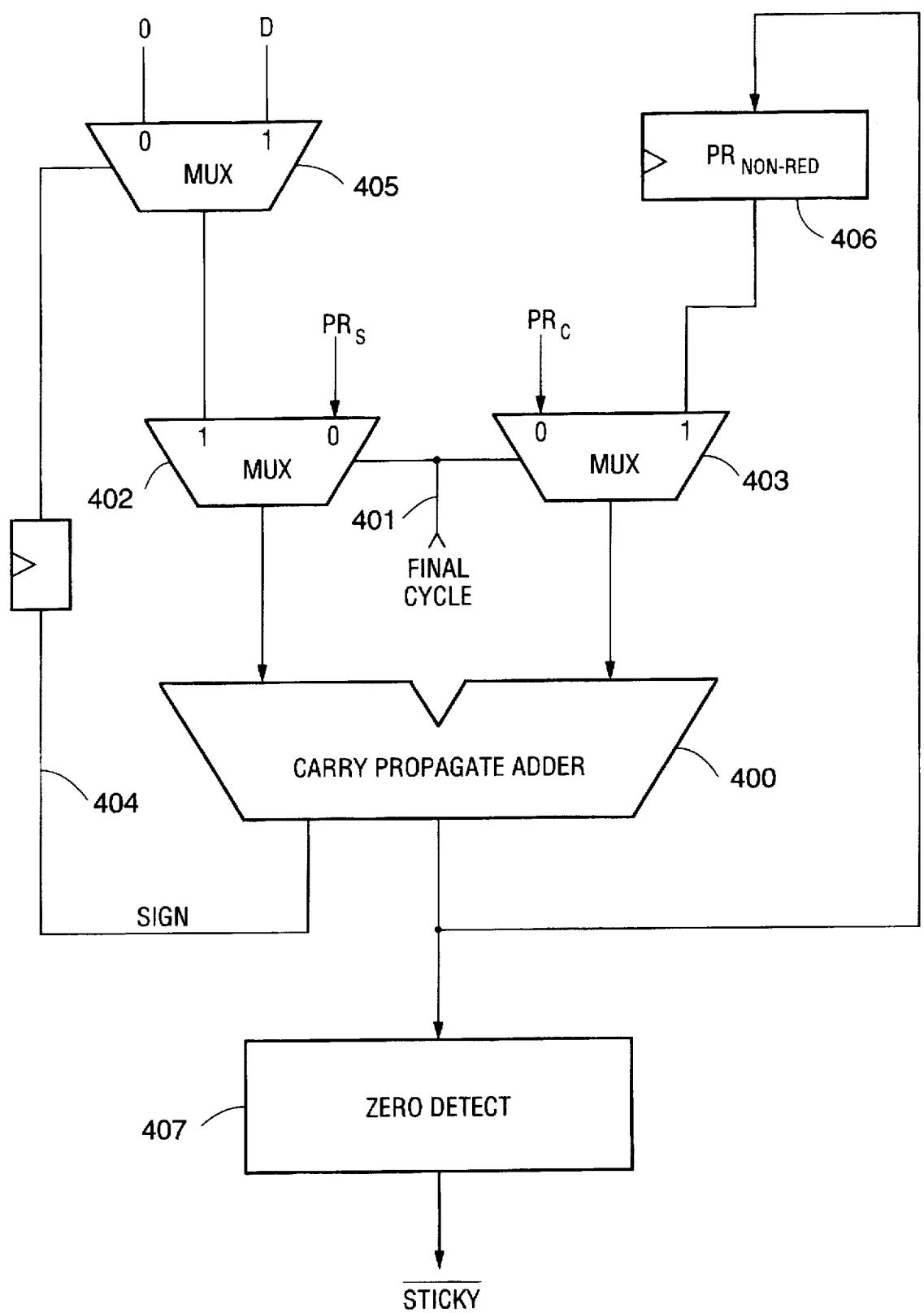
FIG. 4 is a simplified logical illustration of another hardware division module which implements the iterative SRT division algorithm or alternatively restores negative final partial remainders.

The solution illustrated in FIG. 4 reuses the carry-propagate adder 400 that existed for the sticky bit computation shown in FIG. 2. After an iterative datapath such as that depicted in FIG. 1 has produced quotient digits to the desired precision, the redundant partial remainder's carry and sum portions (PRC and PRS, respectively) are input into multiplexors 403 and 402, respectively, while the final cycle signal is low. Carry propagate adder 400 then reduces the redundant partial remainder into a preliminary non-redundant final partial remainder. The most significant output bit 404 of the carry propagate adder 400 indicates the sign of the preliminary final partial remainder. The non-redundant preliminary final partial remainder is latched in flip-flop 406, then the final cycle signal 401 is asserted. If the sign bit 404 indicates that the preliminary final partial remainder is negative, multiplexor 405 is directed to supply the divisor to multiplexor 402 which supplies it to the adder 400. Meanwhile, multiplexor 403 is directing the preliminary non-redundant partial remainder to the other input of the adder 400. The zero detector 407 then produces the sticky bit using the restored partial remainder. If the sign bit indicated a non-negative partial remainder, then multiplexor 405 directs zero to be added to the partial remainder rather than the divisor D.

Both of the solutions illustrated in FIGS. 3 and 4 add extra multiplexor hardware and require an additional cycle to compute the sticky bit when the preliminary final partial remainder is negative. The solution in FIG. 3 especially impacts cycle time for basic iterations since the multiplexor 302 is on the partial remainder formation critical path. Moreover, variable latency instructions in a pipelined superscalar processor make instruction scheduling and bypass control logic much more complex and are generally undesirable. Therefore, even if only a fraction of the total distribution of division operations requires the extra cycle in order to correctly compute the sticky bit, it greatly complicates the processor design to attempt to save the extra cycle for those division instructions which do not result in a negative preliminary final partial remainder. Therefore, the net effect of restoring negative partial remainders is to add another cycle of latency for all divide and square root operations.

According to the present invention, the quotient digit selection logic is modified so as to prevent a partial remainder equal to the negative divisor from occurring. To correctly and efficiently compute the sticky bit for exact division results, enhancing the quotient digit selection function so as to prevent the formation of a negative partial remainder equal to the negative divisor is an ideal solution because it saves hardware and improves latency. Extra hardware is eliminated because it is no longer necessary to provide any extra mechanism for restoring the preliminary final partial remainder. Latency is improved because no additional cycle time is required to restore negative preliminary partial remainders.

According to the present invention, the quotient digit selection logic is altered so as to choose a quotient digit of zero instead of a quotient digit of one when the actual partial remainder is zero. This suggests choosing $q[i+1]=0$ for $2PR[i]_{est}=000.0$. However, since the quotient digit selection function works on an estimated partial remainder, rather than the actual partial remainder, careful design of the quotient selection logic is necessary. An estimated partial remainder could appear to be less than ½ when, in reality, adding the less significant redundant partial remainder bits causes a 1 to propagate into the least significant bit position of the most significant four bits of the actual partial remainder, so that the actual partial remainder is equal to or greater than ½.

If the actual partial remainder is ½ (or greater), $q=1$ should always be chosen since the divisor is constrained by $½ \leq D < 1$. If the actual partial remainder is greater than ½ and $q=0$ is chosen, the next partial is derived by left shifting the actual partial remainder by one bit position without first adding or subtracting the divisor. This left shifting will produce a next actual partial remainder that exceeds the upper bound of ⅔ required to converge on the correct quotient.

If the divisor was greater than the actual partial remainder and positive one was chosen as the quotient digit when the correct quotient digit was zero, this error can be corrected in later iterations. However, if zero is chosen as the quotient digit when the estimated partial remainder is 000.0 and the correct quotient digit is one, there is no way to correct for this error. There is no way to correct for underestimation if $q=0$ is selected when $q=1$ was the correct quotient digit. The result will be irreversibly incorrect and the next partial remainder will be out of the prescribed bounds necessary to converge onto the correct result.

Performing binary addition on the full partial remainder eliminates the estimation problem, but defeats the timing and area benefits of SRT division. A quotient digit of zero could be chosen only when the full partial remainder is zero, but detection of zero for the full partial remainder would be counterproductive for the same reasons.

A simple alternative to the solutions proposed above is to detect a possible carry propagation into the least significant bit of the most significant four bits of the actual partial remainder. This can be accomplished by looking at the fifth most significant sum and carry bits of the redundant partial remainder, $PR_{S,msb-4}$ and $PR_{C,msb-4}$, respectively. If they are both zero, then a carry propagation out of that bit position into the least significant position of the estimated partial remainder is not possible, and a quotient digit of zero should be chosen. In the alternative case in which one or both of the fifth most significant carry or sum bits of the redundant partial remainder are ones, a quotient digit of one should be chosen. Even though the lower bits of the partial remainder could be non-zero, the partial remainder is still within the prescribed bounds ($-½ \leq 2PR \leq ½$), and the correct result will still be correctly computed.

The effect on latency of computation according to the present invention is minimized because the carry-propagate addition necessary to compute the estimated partial remainder is still performed only on the most significant four carry and sum bits of the redundant actual partial remainder. Table IV illustrates the truth table for the refined quotient selection logic according to the present invention.

TABLE IV

Refined QSLC Truth Table

| $2PR_{estimated}$ | quotient digit |
|---|---|
| 000.0 ($2PR_{S,Cmsb-4}$ both 0) | 0 |
| 0xx.x | +1 |
| 111.1 | 0 |
| 1xx.x | −1 |

Figure 5:
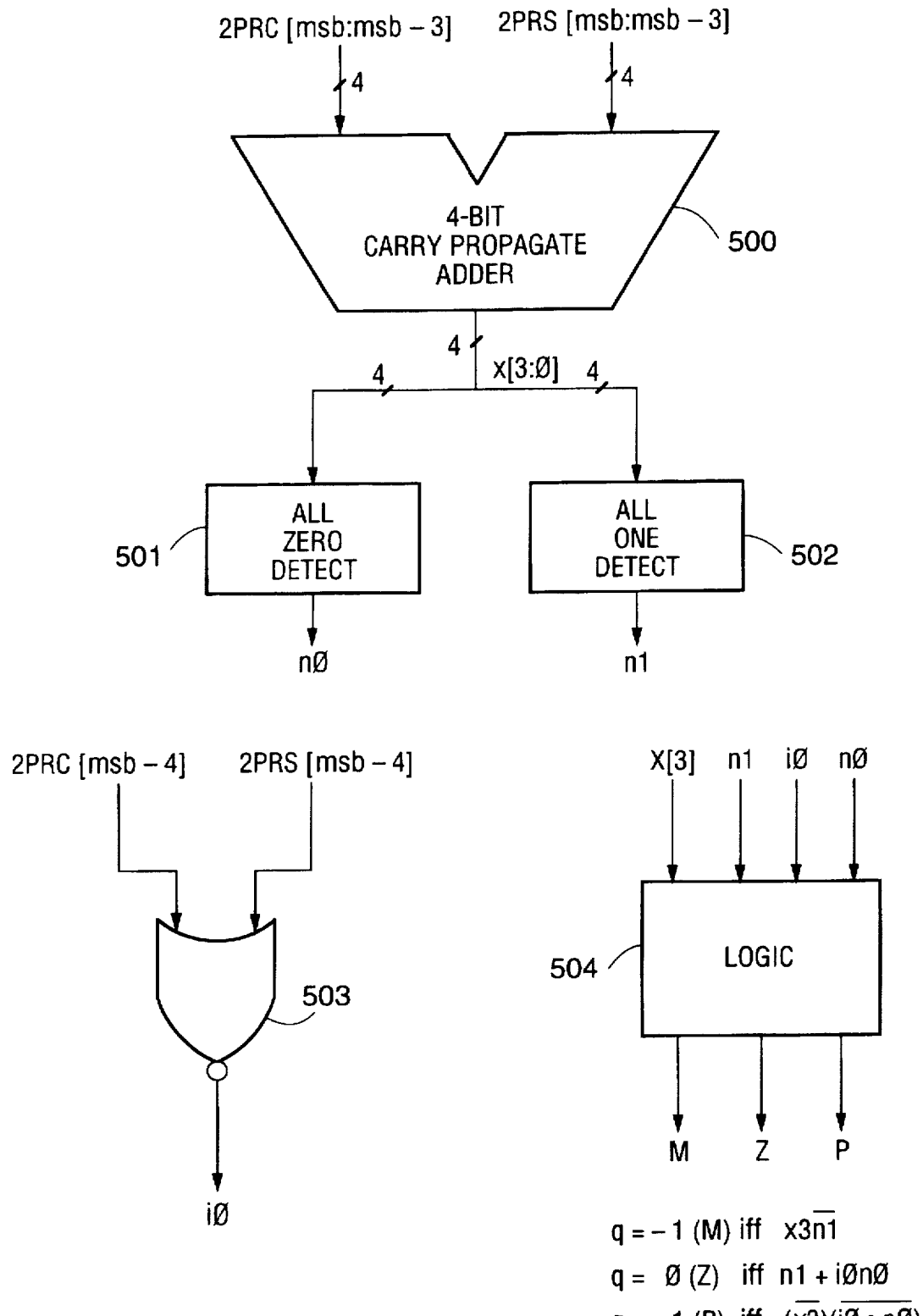
FIG. 5 is a simplified logic diagram of a circuit implementing the quotient selection rules according to the present invention.

FIG. 5 depicts a logical implementation of this enhanced quotient digit selection function. In FIG. 5, a four-bit carry propagate adder 500 takes the most significant four bits of the carry and sum portions of the redundant actual partial remainder (2PRC[msb:msb-3] and 2PRS[msb:msb-3], respectively) as inputs and produces a non-redundant estimated partial remainder x[3:0]. An all-zero detector 501 determines if all four bits of the estimated partial remainder x[3:0] are zeros. If all bits of x[3:0] are zeros, an intermediate signal n0 is asserted. The all zero detector 501 is functionally equivalent to a four input NOR gate. An all-one detector 502 determines whether all bits of x[3:0] are ones. If all bits of x[3:0] are ones, an intermediate signal n1 is asserted. The all-one detector 502 is functionally equivalent to a four input AND gate. A NOR gate 503 takes the fifth most significant carry and sum bits of the redundant partial remainder (2PRC[msb-4] and 2PRS[msb-4], respectively) as inputs and produces an intermediate signal i0, which is asserted only when 2PRC[msb-4] and 2PRS[msb-4] are both zeros.

A block of random logic 504 produces three signals (M, Z, and P) that each correspond to one of the possible quotient digit values according to SRT division. M corresponds to a quotient digit of minus one; Z corresponds to a quotient digit of zero; and P corresponds to a quotient digit of plus one. M is asserted if and only if x[3] is deasserted and n1 is deasserted. Z is asserted if and only if n1 is asserted or i0 and n0 are asserted. P is asserted if and only if x[3] is deasserted and either n0 or i0 is deasserted. Given their respective logical relationships, it is impossible for any two of the quotient digit signals M, Z, and P to be simultaneously asserted.

Figure 6:
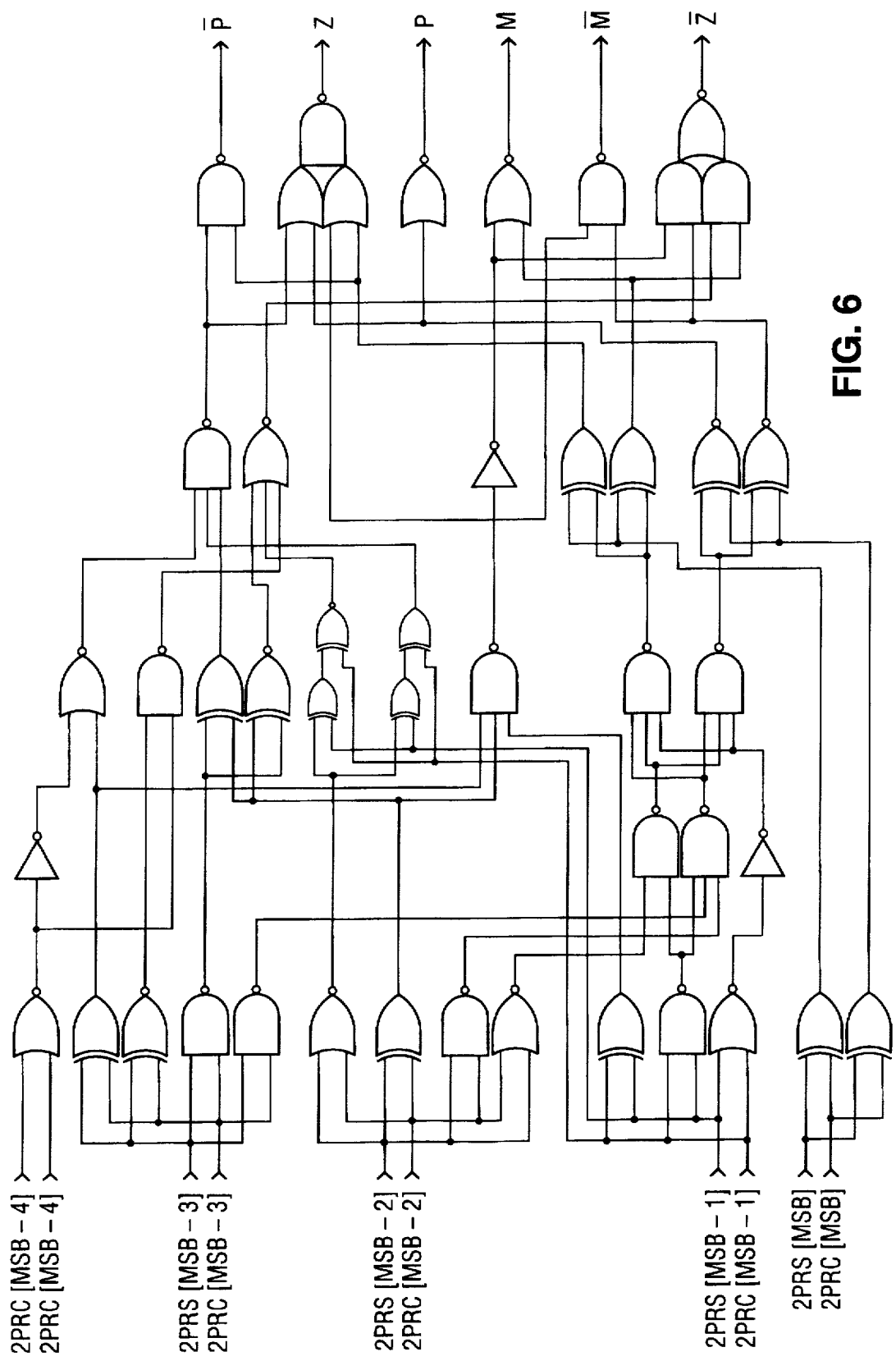
FIG. 6 is a detailed logic diagram of an optimized circuit implementing the quotient selection rules that produces the quotient digit signals and their logical inverses.

Although the implementation illustrated in FIG. 5 is logically correct, in practice, the four bit binary adder and subsequent logic can be merged into an integrated and optimized logic implementation. As shown in FIG. 6, a five-stage logic implementation more efficiently utilizes area and produces the output with less delay. In the implementation of FIG. 6, not only M, Z, and P are computed, but also the logical inverses /M, /Z, and /P are computed as well. This is useful when the quotient signals are used to enable transmission gates such as in a CMOS multiplexor having decoded select inputs. Z, P, /Z, and /P are all dependent upon the most significant five bits of the redundant partial remainder (2PRC[msb:msb-4] and 2PRS[msb:msb-4]) while M and /M are only dependent upon the most significant four bits of the redundant partial remainder bits (2PRC[msb:msb-3] and 2PRS[msb:msb-3]). The cell of FIG. 6 is optimized primarily for delay minimization, with area as a secondary objective. In order to reduce area, much of the logic shown in FIG. 6 is shared between the computations of several of the outputs.

The number of additional gates needed to implement the new radix-2 quotient digit selection logic according to the present invention is relatively small. From Spice simulation analysis of an implementation of the presently preferred embodiment, the impact on the quotient selection logic critical timing path was determined to be less than five percent.

There is an implementation dependent timing trade-off between slower quotient selection logic and eliminating the partial remainder restoration cycle at the end. If the increased delay due to slightly more complicated quotient selection logic does not limit the processor cycle time, a performance gain will always be realized by saving the cycle of latency that would otherwise be required to restore negative final partial remainders. In a modern microprocessor which would include a hardware divider such as according to the present invention, it is likely that the processor cycle time will be determined by some other critical path or will be arbitrarily agreed upon prior to designing the processor. In the likely case that the increased delay of the quotient selection logic is not the longest path, a net savings of one cycle per division operation will be realized with no cost.

In an implementation of the presently preferred embodiment as shown in FIG. 6, the modified quotient selection logic algorithm slowed the internal floating point divider critical path by approximately 100 ps over the analogous optimized critical path using quotient selection rules according to the prior art. This corresponded to less than a two percent slowdown. The limiting timing path on the processor was longer, so there was no negative impact on the processor cycle time from the improved quotient selection logic. The full benefit of eliminating the cycle for restoring the partial remainder prior to sticky detection was realized.

Using the quotient selection logic according to the present invention, it is still possible for negative final partial remainders to occur; however, when they occur, the quotient selection logic according to the present invention guarantees that the negative partial remainders are greater than the negative divisor. Therefore, whenever a negative final partial remainder occurs according to the present invention, Q-1 should be selected and the result is necessarily inexact, and the sticky bit can safely be asserted without fear that the negative final partial remainder equals the negative divisor.

It is possible to save hardware while also performing sign detection and sticky bit calculation in parallel. Instead of using a full 59-bit adder, a 59-bit sign detect adder can be used, slightly improving timing, but mainly saving area. Zero-detection can be done without an explicit addition to convert the redundant partial remainder into binary.

$$t_i = (s_i \oplus c_i) \oplus (s_{i-1} + c_{i-1}) \quad (4)$$

In the above equation, $s_i$ and $c_i$ are the sum and carry values of the final partial remainder. The sticky bit it then computed by:

$$sticky = t_0 + t_1 + \ldots + t_n \quad (5)$$

This method generates inputs to the zero-detector with a 3-input XOR delay instead of the delay of a 59 bit carry-propagate adder, a significant net savings.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of the present invention as recited in the appended claims. For example, the optimized logical implementation of the quotient selection logic shown in FIG. 6 could be designed in a variety of equivalent manners. Alternatively, the circuit of FIG. 6 could compute only the positive polarities of the quotient digits, and omit the computations of the logical inverses so as to control an n-channel pass transistor multiplexor rather than a standard CMOS transmission gate multiplexor. Different and yet optimized implementations would result from implementation in different technologies (for example, NMOS, ECL, etc.) or with different design rules and design tools within the same technology. The appended claims are intended to cover all circuit implementations of the truth Table IV. Accordingly, various changes and modifications which are obvious to a person skilled in the art to which the invention pertains are deemed to lie within the spirit and scope of the invention as claimed.

What is claimed is:

1. A quotient digit selection circuit that determines a quotient digit in binary division and square root operations based upon a redundant partial remainder input, wherein the redundant partial remainder input includes first, second, third, fourth, and fifth sum bits and first, second, third, fourth, and fifth carry bits, and wherein the quotient digit chosen is output by asserting one of a minus output corresponding to a negative one quotient digit, a zero output corresponding to a zero quotient digit, and a plus output corresponding to a positive one quotient digit, the quotient digit selection circuit comprising:

a four-bit carry-propagate adder that takes the first, second, third, and fourth sum bits and the first, second, third, and fourth carry bits as inputs and produces first, second, third, and fourth estimated partial remainder bits as outputs;

a four-bit zero detector that takes the first, second, third, and fourth estimated partial remainder bits as inputs, and that produces an all-zero signal that is asserted if and only if the first, second, third, and fourth estimated partial remainder bits are all zeros;

a four-bit one detector that takes the first, second, third, and fourth estimated partial remainder bits as inputs, and that produces an all-one signal that is asserted if and only if the first, second, third, and fourth estimated partial remainder bits are all ones;

a NOR gate that takes the fifth sum bit and the fifth carry bit as inputs and that produces a fifth bit zero signal; and a zero circuit that takes the all-one signal, the fifth bit zero signal, and the all-zero signal as inputs and that produces the zero output, such that the zero output is asserted if and only if either the all-one signal is asserted or the fifth bit zero signal and the all-zero signal are both asserted.

2. A quotient digit selection circuit as in claim 1, further comprising:

a plus circuit that takes the first estimated partial remainder bit, the all-zero signal, and the fifth bit zero signal as inputs and that produces the plus output, such that the plus output is asserted if and only if the first estimated partial remainder bit is deasserted and either the all-zero signal or the fifth bit zero signal is deasserted.

3. A quotient digit selection circuit as in claim 2, further comprising:
   a minus circuit that takes the first estimated partial remainder bit and the all-one signal as inputs and that produces the minus output, such that the minus output is asserted if and only if the first estimated partial remainder bit is asserted and the all-one signal is deasserted.

4. A quotient digit selection circuit as in claim 1, wherein the four-bit zero detector is a four input OR gate.

5. A quotient digit selection circuit as in claim 1, wherein the four-bit one detector is a four input AND gate.

6. A method, in a computer, of selecting a quotient digit in binary division and square root operations from a redundant partial remainder, wherein the redundant partial remainder includes first, second, third, fourth, and fifth sum bits and first, second, third, fourth, and fifth carry bits, the method comprising the steps of:
   adding, by a circuit of the computer, the first, second, third, and fourth sum bits to the first, second, third, and fourth carry bits to produce first, second, third, and fourth estimated partial remainder bits; and
   selecting, by a circuit of the computer, zero as the quotient digit if and only if either
      (a) the first, second, third, and fourth estimated partial remainder bits are all ones; or
      (b) the first, second, third, and fourth estimated partial remainder bits are all zeros and both the fifth sum bit and fifth carry bit are equal to zero.

7. A method of selecting a quotient digit as in claim 6, further comprising the step of:
   selecting, by a circuit of the computer, positive one as the quotient digit if and only if
      (a) the first estimated partial remainder bit is one; and
      (b) either
         (b)(i) the first, second, third, and fourth estimated partial remainder bits are not all zeros; or
         (b)(ii) the fifth sum bit and the fifth carry bit are not both zero.

8. A method of selecting a quotient digit as in claim 6, further comprising the steps of:
   selecting, by a circuit of the computer, negative one as the quotient digit if and only if
      (a) the first estimated partial remainder bit is deasserted; and
      (b) the first, second, third, and fourth estimated partial remainder bits are not all ones.

9. A method of providing a quotient digit selection circuit that determines a quotient digit in binary division and square root operations based upon a redundant partial remainder input, wherein the redundant partial remainder input includes first, second, third, fourth, and fifth sum bits and first, second, third, fourth, and fifth carry bits, and wherein the quotient digit chosen is output by asserting one of a minus output corresponding to a negative one quotient digit, a zero output corresponding to a zero quotient digit, and a plus output corresponding to a positive one quotient digit, the method comprising the steps of:
   providing a four-bit carry-propagate adder that takes the first, second, third, and fourth sum bits and the first, second, third, and fourth carry bits as inputs and produces first, second, third, and fourth estimated partial remainder bits as outputs;
   providing a four-bit zero detector that takes the first, second, third, and fourth estimated partial remainder bits as inputs, and that produces an all-zero signal that is asserted if and only if the first, second, third, and fourth estimated partial remainder bits are all zeros;
   providing a four-bit one detector that takes the first, second, third, and fourth estimated partial remainder bits as inputs, and that produces an all-one signal that is asserted if and only if the first, second, third, and fourth estimated partial remainder bits are all ones;
   providing a NOR gate that takes the fifth sum bit and the fifth carry bit as inputs and that produces a fifth bit zero signal; and
   providing a zero circuit that takes the all-one signal, the fifth bit zero signal, and the all-zero signal as inputs and that produces the zero output, such that the zero output is asserted if and only if either the all-one signal is asserted or the fifth bit zero signal and the all-zero signal are both asserted.

10. A method of providing a quotient digit selection circuit as in claim 9, the method further comprising the step of:
   providing a plus circuit that takes the first estimated partial remainder bit, the all-zero signal, and the fifth bit zero signal as inputs and that produces the plus output, such that the plus output is asserted if and only if the first estimated partial remainder bit is deasserted and either the all-zero signal or the fifth bit zero signal is deasserted.

11. A method of providing a quotient digit selection circuit as in claim 10, the method further comprising the step of:
   providing a minus circuit that takes the first estimated partial remainder bit and the all-one signal as inputs and that produces the minus output, such that the minus output is asserted if and only if the first estimated partial remainder bit is asserted and the all-one signal is deasserted.

12. A method of providing a quotient digit selection circuit as in claim 9, wherein the four-bit zero detector is a four input OR gate.

13. A method of providing a quotient digit selection circuit as in claim 9, wherein the four-bit one detector is a four input AND gate.

* * * * *